United States Patent Office 3,819,623
Patented June 25, 1974

3,819,623
3,7-DISUBSTITUTED CEPHALOSPORIN COMPOUNDS
Tadayoshi Takano, Hirakata, Masaru Kurita, Takatsuki, Hiroo Nikaido, Ikeda, Masashi Mera, Amagasaki, Nobukiyo Konishi, Kyoto, and Ritsuko Okui, Takatsuki, Japan, assignors to Fujisawa Pharmaceutical Co., Ltd., Higashiku, Osaka, Japan
Continuation-in-part of application Ser. No. 721,082, Apr. 12, 1968, now Patent No. 3,516,997. This application Oct. 23, 1969, Ser. No. 868,834
The portion of the term of the patent subsequent to June 23, 1987, has been disclaimed
Int. Cl. C07d 99/24
U.S. Cl. 260—243 C   2 Claims

ABSTRACT OF THE DISCLOSURE

The cephalosporin compound of this invention is the sodium salt of 7-(1H-tetrazol-1-ylacetamido)-3-(5-methyl-1,3,4 - thiadiazol-2-yl-thiomethyl)-3-cephem-4-carboxylic acid in the form of the hydrates containing 5 molecules of water and 3/2 molecules of water and in amorphous form. Said novel salts can be stored for a prolonged period of time without any loss in potency when used therapeutically against a number of microorganisms including gram-positive and gram-negative bacteria. Furthermore a number of highly effective antibacterial 7-acylated amino-3-(thiolated methyl)ceph-3-em-4-carboxylic acids and their salts are described.

CROSS-REFERENCE TO RELATED APPLICATION

The present application is a continuation-in-part of copending application Ser. No. 721,082, filed Apr. 12, 1968 and entitled "3,7-Substituted Cephalosporin Compounds and Preparation Thereof," now Pat. No. 3,516,997.

Said application and its contents are included by reference hereinto.

BACKGROUND OF THE INVENTION (1) Field of the invention

This invention relates to novel, highly effective, and stable cephalosporin compounds and more particularly to novel forms of the sodium salt of 7-(1H-tetrazol-1-yl acetamido)-3-(5-methyl-1,3,4-thiadiazol-2-yl thiomethyl)-3-cephem-4-carboxylic acid, to a process of preparing same, to pharmaceutical compositions containing same, and to a method of using same therapeutically in the treatment of infections.

DESCRIPTION OF THE PRIOR ART

In copending application Ser. No. 721,082, now Pat. No. 3,516,997, novel and highly active 3,7-disubstituted cephalosporin compounds are disclosed and claimed. One of said compounds is 7-(1H-tetrazol-1-yl acetamido)-3-(5-methyl-1,3,4 - thiadiazol-2-yl thiomethyl)-3-cephem-4-carboxylic acid. Its preparation is described in Example 18(b). This acid has proved to be of great value in therapy on account of its broad spectrum of antibacterial activity. It is employed as a therapeutic agent particularly in humans for the treatment of infectious diseases caused by both gram-positive and gram-negative bacteria.

As disclosed in said copending application, said acid can be prepared according to a process which in principle comprises the reaction of 7-aminocephalosporanic acid or its salts with 1H-tetrazole-1-acetic acid or reactive derivatives thereof in the presence or absence of a condensing agent such as N,N'-dicyclohexylcarbodiimide, followed by the nucleophilic replacement reaction of the resultant 7-(1H-tetrazol-1-yl acetamido)cephalosporanic acid or salts thereof with 5-methyl-1,3,4-thiadiazole-2-thiol or alkali metal salts thereof and the conversion of the reaction product into the sodium salt by reaction with a sodium compound capable of introducing a sodium ion into the carboxyl group of said reaction product, for instance, by reaction with sodium bicarbonate, sodium acetate, sodium benzoate, sodium salicylate, sodium hydroxide, and the like.

SUMMARY OF THE INVENTION

It is one object of the present invention to provide the highly effective antibacterial sodium salt of 7-(1H-tetrazol-1-yl acetamido)-3-(5-methyl-1,3,4-thiadiazol-2-yl thiomethyl)-3-cephem-4-carboxylic acid in a form in which it is highly stable on storage and does not show any substantial loss in activity even on storage for a prolonged period of time.

Another object of the present invention is to provide a simple and effective process of making such a stable and highly effective sodium salt.

A further object of the present invention is to provide novel and highly effective antibacterial 3,7-disubstituted cephalosporin compounds in addition to those disclosed in copending application Ser. No. 721,082.

A further object of the present invention is to provide novel and highly effective antibacterial 3,7-disubstituted cephalosporin compounds in which the diazolyl substituent $R^2$ of the compounds of Formula I of copending application Ser. No. 721,082 is an imidazolyl substituent.

A further object of the present invention is to provide novel and highly effective antibacterial cephalosporin compounds in which the substituent $R^2$ of the compounds of Formula I of copending application Ser. No. 721,082 is a diazinyl substituent, such as a pyridazinyl substituent.

A further object of the present invention is to provide a simple and effective process of making such novel and effective antibacterial 3,7-disubstituted cephalosporin compounds.

A further object of the present invention is to provide pharmaceutical compositions containing, as highly effective antibacterial agents, such novel 3,7-disubstituted cephalosporin compounds and their salts.

Still another object of the present invention is to provide a method of treating infectious diseases caused by bacteria in humans and animals.

Other objects of the present invention and advantageous features thereof will become apparent as the description proceeds.

It was found that the sodium salt of the highly effective antibacterial 7-(1H-tetrazol-1-yl acetamido)-3-(5-methyl-1,3,4-thiadiazol-2 - yl thiomethyl)-3-cephem-4-carboxylic acid can be prepared in the form of a hydrate containing 5 molecules of water. Said pentahydrate will be designated hereinafter and in the claims annexed hereto as the "α-form."

It was furthermore found that the α-form can readily be converted into another crystalline form which contains 3/2 molecules of water. Said trihemihydrate will be designated hereinafter and in the claims annexed hereto as the "β-form." Conversion of the α-form into the β-form is effected by treating the α-form with a solvent, such as an alcohol, preferably methanol of a concentration exceeding 70%, or ethanol of a concentration exceeding 80%. The β-form is obtained in optimum yields by treating the α-form with methanol of a concentration above 99% or with ethanol of a concentration above 95%.

It was also found that the β-form can be reconverted in the α-form by treating the β-form with an alcohol such as methanol or ethanol of lower concentration, preferably with methanol of a concentration lower than 70%, or with ethanol of a concentration lower than 80%.

Use of alcohols of such a concentration results in the sole production of the α-form. When alcohols of other concentrations are used a mixture of the α- and β-forms is usually produced. The resulting α- or β-forms are isolated by conventional methods such as by filtration or centrifuging. The α-form can also be obtained by exposure of the β-form to an atmosphere of 100% humidity.

When the preparation of the sodium cephalosporin compound of this invention is carried out in the presence of alcohols, such as ethylene glycol, propylene glycol or aqueous ethanol, the resulting sodium salt may contain said alcohols as alcohol of crystallization as well as water of crystallization. In place of aqueous ethanol, isopropanol may be employed in the treatment.

It has also been found that the lower the water content of the sodium cephalosporin compound is, the better is its stability. Attempts have been made to lower the water content of said highly useful compound, for instance, by commonly available drying techniques, the application of heat, vacuum drying, freeze drying and other drying techniques. The preferred water content was found to be below 2%. However, even if the water content of the sodium 3,7-disubstituted cephalosporin compound is higher than the preferred content, the antibacterial acitvity of said compound in the treatment of infectious diseases caused by microorganisms is not impaired. By reducing the water combined with and contained in said compound by subjecting it to the known drying methods, it was found that the α- and β-forms are converted into amorphous form. The amorphous forms obtained by drying either the α-form or the β-form have different characteristic features and properties. Thus the amorphous form obtained from the α-form yields, when exposed to the atmosphere, solely the α-form, and vice versa. Likewise the amorphous form prepared by drying the β-form, yields solely the β-form on exposure to the atmosphere.

The sodium cephalosporanic compound of this invention is used in therapy in the form of pharmaceutical preparations which contain the same in admixture with a pharmaceutically acceptable organic or inorganic, solid or liquid excipient suitable for oral or parenteral administration. The pharmaceutical preparations may be in solid form such as capsules, tablets, or dragees, or in liquid form such as solutions, suspensions, or emulsions. If desired, there can be included in the above preparations auxiliary substances, stabilizing agents, wetting or emulsifying agents and buffers. While the dosage of the compounds will vary from and also depend upon the age and condition of the patient, an average dosage of about 250 mg. or more or less of the compound generally is effective in treating diseases caused by bacteria against which the compound is useful.

In addition to the sodium salt of 7-(1H-tetrazol-1-yl acetamido)-3-(5-methyl-1,3,4-thiadiazol-2-yl thiomethyl)-3-cephem-4-carboxylic acid and to the compounds of Formula I described in copending application Ser. No. 721,082, there have been produced a number of other compounds which have also proved of value as antibacterial agents. Said compounds correspond also to Formula I of application Ser. No. 721,082.

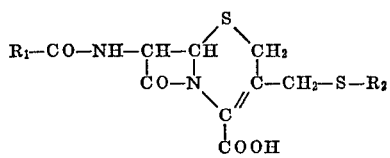

in which
R₁ is a member selected from the group consisting of
R₃—(Alk)$_m$— and R₃—S—(Alk)$_m$— wherein
R₃ is thienyl, thiazolyl, thiadiazolyl, oxadiazolyl, tetrazolyl, and others, said members being unsubstituted or substituted, for instance, by lower alkyl such as methyl;

m is zero or one; and

Alk is alkylene; while

R₂ is a member selected from the group consisting of diazolyl such as imidazolyl, tetrazolyl, thiadiazolyl, oxadiazolyl, diazinyl such as pyridazinyl, and others, said members being unsubstituted or substituted, for instance, by lower alkyl such as methyl, hydroxy alkyl such as hydroxy ethyl, hologenoalkyl such as chloro methyl, alkoxy alkyl, such as methoxy propyl, alkyl thio such as methyl thio, alkyl thioalkyl such as methyl thio methyl, dialkylamino alkyl such as dimethylamino methyl, carboxyl, alkoxy carbonyl such as methoxy carbonyl, amino, carboxy alkyl such as carboxy methyl, alkoxy carbonyl alkyl such as ethoxy carbonyl methyl, dialkylamino alkylamino carbonyl alkyl such as dimethylamino ethyl amino carbonyl methyl, alkoxy alkylamino carbonyl akyl, such as methoxy propylamino carbonyl methyl, and by other substituents.

The salts of such compounds with alkali metals, alkaline earth metals, and the like and with organic amines, such as dicyclohexylamine, dibenzylamine, N-(2,6-dimethyl phenyl) amino carbonyl methyl diethylamine, and others are prepared according to processes known to the art.

Esters of the acids according to the present invention can also be prepared. Suitable esters are, for instance, the allyl, methoxy methyl, β-bromo benzoyl methyl ester and others. They are also prepared according to conventional methods of ester formation.

The novel compounds described and claimed herein possess also a high antibacterial activity and have proved of value in the treatment of infections caused by gram-positive as well as by gram-negative bacteria.

BRIEF DESCRIPTION OF THE DRAWINGS

The crystalline α- and β-forms of the sodium salts of 7-(1H-tetrazol-1-yl acetamido)-3-(5-methyl-1,3,4-thiadiazol-2-yl thiomethyl)-3-cephem-4-carboxylic acid are distinguished by their infrared spectra determined in Nujol mulls and analyzed according to the method of Karl Fisher. The attached drawings show in FIG. 1 the infrared absorption spectrum of the α-form and in FIG. 2 the infrared absorption spectrum of the β-form of said sodium salt.

DESCRIPTION OF THE PREFERRED EMBODIMENTS

Figure 1:
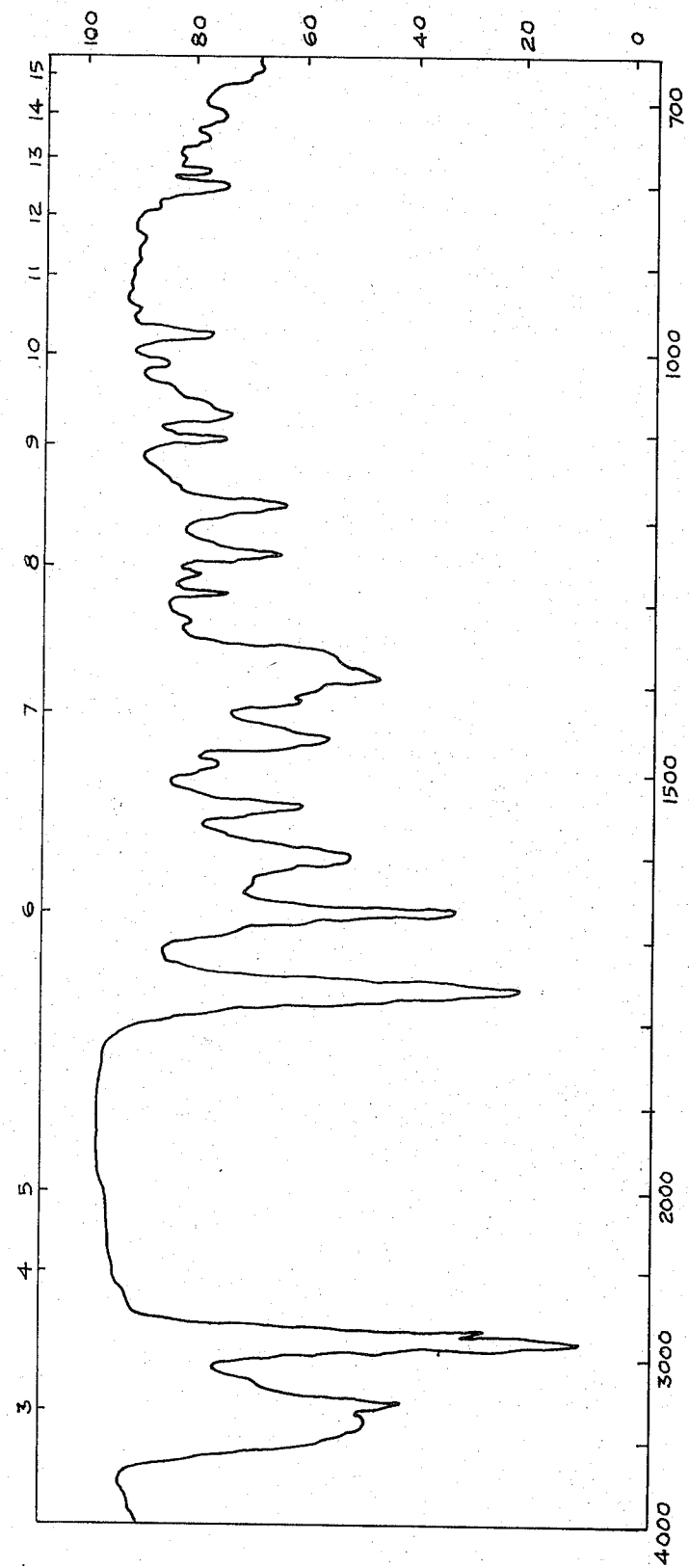
Figure 2:
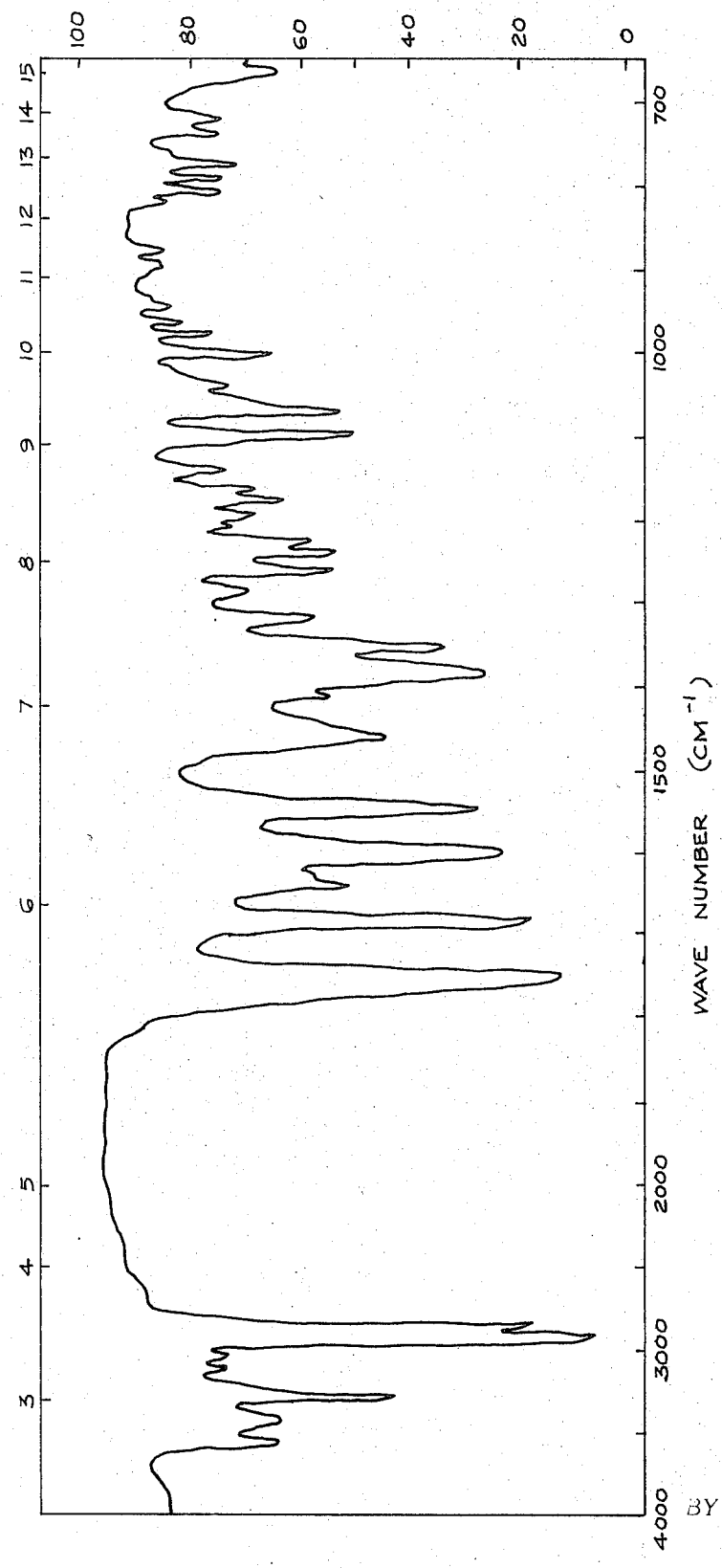

The following examples serve to illustrate the present invention without, however, limiting the same thereto.

Example 1

7.35 g. of 7-(1H-tetrazol-1-ylacetamido)-3-(5-methyl-1,3,4 - thiadiazol-2-ylthiomethyl)-3-cephem-4-carboxylic acid prepared according to Example 18(b) of Application Ser. No. 721,082 were dissolved in a solution of 1.3 g. of sodium bicarbonate in 15 ml. of water. 70 ml. of 99% ethanol were added to said solution. The mixture was allowed to stand to precipitate a crystalline material which was collected by filtration and washed with 20 ml. of 95% ethanol. The resulting 6.0 g. of the salt were dried over silica gel under reduced pressure for one day and exposed to the atmosphere for one day to yield the α-form.

Analysis for $C_{14}H_{13}N_8O_4S_3Na \cdot 5H_2O$:

| | C | H | N | S | Na | H₂O |
|---|---|---|---|---|---|---|
| Calculated | 29.68 | 4.09 | 19.78 | 16.98 | 4.06 | 15.90 |
| Found | 29.78 | 4.12 | 19.66 | 16.84 | 4.03 | 15.75 |

UV: $\lambda^{H_2O}_{max.}$ 272 mμ ($E^{1\%}_{1cm.}$ 234)

Example 2

20 g. of sodium 7-(1H-tetrazol-1-ylacetamido)-3-(5-methyl-1,3,4-thiadiazol-2-ylthiomethyl) - 3 - cephem-4-carboxylate (α-form) obtained according to Example 1 were recrystallized from 100 ml. of 99% methanol. The solution was vigorously stirred. The resulting crystalline material was filtered, dried over silica gel under reduced pressure for one day, and exposed to the atmosphere to give the β-form.

Analysis for $C_{14}H_{13}N_8O_4S_3Na \cdot 3/2 H_2O$

|  | C | H | N | S | Na | $H_2O$ |
|---|---|---|---|---|---|---|
| Calculated | 33.39 | 3.20 | 22.26 | 19.10 | 4.57 | 5.40 |
| Found | 33.65 | 3.04 | 22.29 | 19.26 |  | 5.27 |

UV: $\lambda_{max.}^{H_2O}$ 272 mμ ($E_{1\,cm.}^{1\%}$ 263)

Example 3

5 g. of the β-form of the sodium salt were recrystallized from 80% ethanol. 4 g. of the α-form were obtained thereby.

Example 4

The β-form was transformed to the α-form by keeping it in an atmosphere of 100% humidity.

The sodium cephalosporin compound of Examples 1 to 4 in both the α-form and the β-form as well as in the respective amorphous forms exhibits a high activity against a number of micro-organisms such as those set forth below. The activity of said compound is expressed as its minimum inhibitory concentration (MIC) which is determined by the usual serial agar dilution method. The tests were performed with bacteria by using a glucose bouillon culture medium. The test medium was incubated for 24 hours at 30° C.

| Test organisms: | MIC in mcg./ml. |
|---|---|
| *Staphylococcus aureus* Newman | 0.5 |
| *Staphylococcus aureus* Terashima | 1.0 |
| *Staphylococcus aureus* Smith | 0.125 |
| *Staphylococcus aureus* 209–P | 1.0 |
| *Bacillus subtilis* ATCC 6633 | 0.5 |
| *Diplococcus pneumoniae* III | 0.25 |
| *Streptococcus hemolyticus* S–23 | 0.125 |
| *Sarcina lutea* PCI–1001 | 1.0 |
| *Salmonella typhi* T–287 | 1.25 |
| *Salmonella typhi* O–901 | 1.0 |
| *Salmonella enteritidis* | 1.0 |
| *Klebsiella pneumoniae* | 5.0 |
| *Escherichia coli* NIHJ | 1.0 |
| *Shigella flexneri* 2a | 2.5 |
| *Shigella sonnei* I | 2.5 |
| *Proteus vulgaris* IAM–1023 | 100.0 |
| *Pseudomonas aeruginosa* IAM–1095 | 100.0 |

Example 5

The salt in the α-form as obtained according to Example 1 was freeze-dried. The freeze-dried salt contained 6.86% of water. Table I shows its stability on storing at various temperatures.

TABLE 1

| Temperature | Storage time | Percent loss |
|---|---|---|
| 100° C | 3.5 hours | 28 |
|  | 6 hours | 47 |
|  | 9 hours | 53 |
| 80° C | 20 hours | 27 |
|  | 40 hours | 44 |
|  | 60 hours | 54 |
| 70° C | 50 hours | 31 |
|  | 100 hours | 41 |
|  | 150 hours | 49 |
| 60° C | 5 days | 26 |
|  | 10 days | 33 |
|  | 15 days | 44 |
| 45° C | 15 days | 9 |
|  | 1 month | 11 |
|  | 1.5 months | 16 |

Example 6

The salt in the β-form as obtained according to Example 2 was dried under reduced pressure. The vacuum-dried salt contained 5.5% of water. Table 2 shows its stability on storing at various temperatures.

TABLE 2

| Temperature | Storage time | Percent loss |
|---|---|---|
| 100° C | 5 hours | 11 |
|  | 10 hours | 14 |
|  | 15 hours | 22 |
| 80° C | 50 hours | 22 |
|  | 100 hours | 33 |
|  | 150 hours | 45 |
| 70° C | 100 hours | 19 |
|  | 200 hours | 26 |
|  | 300 hours | 39 |
| 60° C | 10 days | 15 |
|  | 21 days | 21 |
| 45° C | 1 month | 9 |
|  | 3 months | 19 |

Example 7

The salt in the β-form as obtained according to Example 2 was placed into a brown ampoule and was dried therein in a vacuum of 1 mm. Hg at 110° C. for 20 minutes, immediately whereafter the ampoule was sealed. This salt contained 1.2% of water. Before each determination of the activity the ampoule was opened after it had been exposed to the temperatures given in Table 3 for the given period of time. Table 3 shows the stability of the salt when stored in a sealed container.

TABLE 3

| Temperature | Storage time | Percent loss |
|---|---|---|
| 100° C | 10 hours | 0 |
|  | 20 hours | 5 |
|  | 30 hours | 6 |
| 80° C | 50 hours | 0 |
|  | 100 hours | 3 |
|  | 150 hours | 2 |
| 70° C | 100 hours | 3 |
|  | 200 hours | 4 |
|  | 400 hours | 3 |

Example 8

An injectable solution containing the sodium salt of the 7-(1H - tetrazol - 1 - ylacetamido)-3-(5-methyl-1,3,4-thiadiazol-2-ylthiomethyl)-3-cephem-4-carboxylic acid is prepared by dissolving 250 g., 500 g., or, respectively, 1000 g. thereof in 2.0 liters of distilled water or of a 5% aqueous lidocaine hydrochloride or, respectively, procaine hydrochloride solution and filling 2.0 ml. of said solution into each ampoule which is then sealed.

According to another embodiment of the present invention a number of novel and highly effective anti-bacterial 3,7-disubstituted cephalosporin compounds of Formula I as given in Application Ser. No. 721,082 were produced. Such compounds have the following substituents $R^3$ and $R^2$ as defined in said Formula I

| Group | $R^3$ | $R^2$ |
|---|---|---|
| (a) | Thiadiazolyl | Thiadiazolyl. |
| (b) | do | 1H-tetrazolyl. |
| (c) | Thiazolyl | Do. |
| (d) | do | Thiadiazolyl. |
| (e) | do | Oxadiazolyl. |
| (f) | Oxadiazolyl | 1H-tetrazolyl. |
| (g) | do | Thiadiazolyl. |
| (h) | Thienyl | Do. |
| (i) | do | Diazolyl. |
| (j) | do | Diazinyl. |
| (k) | 1H-tetrazolyl | Thiadiazolyl. |
| (l) | do | 1H-tetrazolyl. |
| (m) | do | Oxadiazolyl. |

The following examples serve to illustrate these groups of compounds without, however, being limited thereto.

Example 9

To a solution of 500 mg. of 7-(2-thiazolylthioacetamido)cephalosporanic acid and 98 mg. of sodium bicarbonate in 20 ml. of phosphate buffer (pH 6.4) there were added 163 mg. of 1-methyl-1H-tetrazole-5-thiol. The solution was stirred for 5 hours at 60° C. The reaction mixture was adjusted by the addition of 10% hydrochloric acid to a pH of 4.0 and was washed with 100 ml. of ether. The water layer was separated, acidified with 10% hydrochloric acid to a pH of 2.0, and extracted with ethyl acetate. The extract was dried over sodium sulfate and concentrated by evaporation under reduced pressure to yield 338 mg. of a white powder of 7-(2-thiazolylthioacetamido)-3-(1-methyl-1H-tetrazol-5-ylthiomethyl)-3-cephem-4-carboxylic acid melting at 110–115° C. (decomposed). This product (200 mg.) was recrystallized from 99% ethanol to yield 42 mg. of pure white crystals, m.p. 166–167° C.

UV: $\lambda_{max.}^{phosphate\ buffer\ (pH\ 6.4)}$ 272 m$\mu$ ($E_{1cm.}^{1\%}$ 318)

MIC (mcg./ml.): *E. coli* 0.5; *S. aur.* 0.25

Example 10

In substantially the same manner as described in Example 9, there were obtained by using the corresponding cephalosporanic acids and thiols:

(a) 7-(2 - Thiazolylthioacetamido)-3-(5 - methyl-1,3,4-thiadiazol-2-ylthiomethyl)-3-cephem - 4 - carboxylic acid, m.p. 143–144° C. (decomposed).

UV: $\lambda_{max.}^{phosphate\ buffer\ (pH\ 6.4)}$ 273 m$\mu$ ($E_{1cm.}^{1\%}$ 346)

MIC (mcg./ml.): *E. coli* 1.0; *S. aur.* 0.25

(b) 7-(2-Thiazolylthioacetamido)-3-(1,3,4 - thiadiazol-2-ylthiomethyl)-3-cephem - 4 - carboxylic acid, m.p. 125–129° C. (decomposed).

UV: $\lambda_{max.}^{phosphate\ buffer\ (pH\ 6.4)}$ 273 m$\mu$ ($E_{1cm.}^{1\%}$ 336)

MIC (mcg./ml.): *E. coli* 2.5; *S. aur.* 0.1

(c) 7-(2-Thiazolylthioacetamido)-3-(5 - methyl - 1,3,4-oxadiazol-2-ylthiomethyl)-3-cephem - 4 - carboxylic acid, m.p. 155–160° C. (decomposed).

UV: $\lambda_{max.}^{phosphate\ buffer\ (pH\ 6.4)}$ 271 m$\mu$ ($E_{1cm.}^{1\%}$ 264)

MIC (mcg./ml.): *E. coli* 10.0; *S. aur.* 0.5

(d) 7-(1,2,5-Thiadiazol - 3 - ylacetamido)-3-(5-methyl-1,3,4-thiadiazol - 2 - ylthiomethyl)-3-cephem-4-carboxylic acid, m.p. 190° C. (decomposed).

UV: $\lambda_{max.}^{phosphate\ buffer\ (pH\ 6.4)}$ 263 m$\mu$ ($E_{1cm.}^{1\%}$ 422)

MIC (mcg./ml.): *E. coli* 1.25; *S. aur.* 1.0

(e) 7 - (1,2,5 - Thiadiazol - 3 - ylacetamido)-3-(1-methyl - 1H - tetrazol - 5-ylthiomethyl)-3-cephem-4-carboxylic acid, UV: $\lambda_{max.}^{phosphate\ buffer\ (pH\ 6.4)}$ 259 m$\mu$ ($E_{1cm.}^{1\%}$ 356)

MIC (mcg./ml.): *E. coli* 1.25; *S. aur.* 1.0

(f) 7 - (5 - Methyl-1,3,4-thiadiazol-2-ylacetamido)-3-(1 - methyl - 1H - tetrazol-5-ylthiomethyl)-3-cephem-4-carboxylic acid, m.p. 176° C. (decomposed).

UV: $\lambda_{max.}^{phosphate\ buffer\ (pH\ 6.4)}$ 270 m$\mu$ ($E_{1cm.}^{1\%}$ 211)

MIC (mcg./ml.): *E. coli* 2.5; *S. aur.* 0.5

(g) 7 - (5 - Methyl - 1,3,4-thiadiazol-2-ylacetamido)-3 - (5 - methyl-1,3,4-thiadiazol-2-ylthiomethyl)-3-cephem-4-carboxylic acid.

UV: $\lambda_{max.}^{phosphate\ buffer\ (pH\ 6.4)}$ 273 m$\mu$ ($E_{1cm.}^{1\%}$ 239)

MIC (mcg./ml.): *E. coli* 10.0; *S. aur.* 0.5

(h) 7 - (4 - Methyl - 1,2,5-oxadiazol-3-ylacetamido)-3-(1 - methyl - 1H - tetrazol-5-ylthiomethyl)-3-cephem-4-carboxylic acid, m.p. 145° C. (decomposed).

UV: $\lambda_{inf.}^{phosphate\ buffer\ (pH\ 6.4)}$ 244 m$\mu$ ($E_{1cm.}^{1\%}$ 214)

$\lambda_{inf.}^{phosphate\ buffer\ (pH\ 6.4)}$ 260 m$\mu$ ($E_{1cm.}^{1\%}$ 203)

(i) 7 - (4 - Methyl - 1,2,5-oxadiazol-3-ylacetamido)-3 - (5 - methyl-1,3,4-thiadiazol-2-ylthiomethyl)-3-cephem-4-carboxylic acid, m.p. 190° C. (decomposed).

UV: $\lambda_{max.}^{phosphate\ buffer\ (pH\ 6.4)}$ 270 m$\mu$ ($E_{1cm.}^{1\%}$ 214)

MIC (mcg./ml.): *E. coli* 2.5; *S. aur.* 0.5

(j) 7 - (2 - Thienylacetamido) - 3 - (5-amino-1,3,4-thiadiazol-2-ylthiomethyl)-3-cephem-4-carboxylic acid.

MIC (mcg./ml.): *E. coli* 1.25; *S. aur.* 0.5

(k) 7 - (2 - Thienylacetamido) - 3 - (1-methyl-1H-imidazol-2-ylthiomethyl)-3-cephem-4-carboxylic acid.

UV: $\lambda_{max.}^{phosphate\ buffer\ (pH\ 6.4)}$ 240 m$\mu$ ($E_{1cm.}^{1\%}$ 368)

$\lambda_{inf.}^{phosphate\ buffer\ (pH\ 6.4)}$ 260 m$\mu$ ($E_{1cm.}^{1\%}$ 222)

MIC (mcg./ml.): *E. coli* 50.0; *S. aur.* 5.0

(l) 7 - (2 - Thienylacetamido) - 3 - (6-methyl-3-pyridazinylthiomethyl) - 3 - cephem - 4 - carboxylic acid, m.p. 100–104° C.

UV: $\lambda_{max.}^{phosphate\ buffer\ (pH\ 6.4)}$ 230 m$\mu$ ($E_{1cm.}^{1\%}$ 311)

$\lambda_{max.}^{phosphate\ buffer\ (pH\ 6.4)}$ 267 m$\mu$ ($E_{1cm.}^{1\%}$ 187)

MIC (mcg./ml.): *E. coli* 25.0; *S. aur.* 1.25

(m) 7 - (1H - Tetrazol - 1 - ylacetamido)-3-(5-propyl-1,3,4 - thiadiazol - 2-ylthiomethyl)3-cephem-4-carboxylic acid, m.p. 195–196° C. (decomposed).

UV: $\lambda_{max.}^{phosphate\ buffer\ (pH\ 6.4)}$ 273 m$\mu$ ($E_{1cm.}^{1\%}$ 270)

MIC (mcg./ml.): *E. coli* 2.5; *S. aur.* 0.5

(n) 7 - (1H - Tetrazol - 1 - ylacetamido)-3-(5-isobutyl-1,3,4 - thiadiazol - 2 - ylthiomethyl)-3-cephem-4-carboxylic acid, m.p. 185–187° C.

UV: $\lambda_{max.}^{phosphate\ buffer\ (pH\ 6.4)}$ 273 m$\mu$ ($E_{1cm.}^{1\%}$ 282)

MIC (mcg./ml.): *E. coli* 2.5; *S. aur.* 0.5

(o) 7 - (5 - Methyl - 1H-tetrazol-1-ylacetamido)-3-(5-methyl - 1,3,4 - thiadiazol - 2-ylthiomethyl)-3-cephem-4-carboxylic acid, m.p. 158–161° C.

UV: $\lambda_{max.}^{phosphate\ buffer\ (pH\ 6.4)}$ 273 m$\mu$ ($E_{1cm.}^{1\%}$ 274)

(p) 7 - (2H - Tetrazol - 2-ylacetamido)-3-(5-methyl-1,3,4-thiadiazol - 2 - ylthiomethyl)-3-cephem-4-carboxylic acid, m.p. 173–174° C. (decomposed).

UV: $\lambda_{max.}^{phosphate\ buffer\ (pH\ 6.4)}$ 273 m$\mu$ ($E_{1cm.}^{1\%}$ 278)

MIC (mcg./ml.): *E. coli* 6.25; *S. aur.* 0.2

(q) 7 - (2H - Tetrazol-2-ylacetamido)-3-(1-methyl-1H-tetrazol - 5 - ylthiomethyl) - 3 - cephem-4-carboxylic acid, m.p. 103–113° C. (decomposed).

UV: $\lambda_{max.}^{phosphate\ buffer\ (pH\ 6.4)}$ 260 m$\mu$ ($E_{1cm.}^{1\%}$ 188)

(r) 7 - (3 - Methyl - 1,2,4-thiadiazol-5-ylacetamido)-3 - (1 - methyl - 1H-tetrazol-5-ylthiomethyl)-3-cephem-4-carboxylic acid, m.p. 115–126° C. (decomposed).

UV: $\lambda_{max.}^{phosphate\ buffer\ (pH\ 6.4)}$ 230–235 m$\mu$ ($E_{1cm.}^{1\%}$ 269)

$\lambda_{inf.}^{phosphate\ buffer\ (pH\ 6.4)}$ 260–265 m$\mu$ ($E_{1cm.}^{1\%}$ 184)

(s) 7 - (3 - Methyl - 1,2,4-thiadiazol-5-ylacetamido)-3 - (5 - methyl - 1,3,4 -thiadiazol - 2 - ylthiomethyl) - 3-cephem-4-carboxylic acid, m.p. 93–99° C. (decomposed).

UV: $\lambda_{max.}^{phosphate\ buffer\ (pH\ 6.4)}$ 235 m$\mu$ ($E_{1cm.}^{1\%}$ 249)

$\lambda_{max.}^{phosphate\ buffer\ (pH\ 6.4)}$ 277 m$\mu$ ($E_{1cm.}^{1\%}$ 214)

(t) 7 - (1H - Tetrazol-1-ylacetamido)-3-(5-methylthio-1,3,4 - thiadiazol - 2 - ylthiomethyl) - 3 - cephem-4-carboxylic acid, m.p. 189–192° C. (decomposed).

UV: $\lambda_{max.}^{phosphate\ buffer\ (pH\ 6.4)}$ 276 m$\mu$ ($E_{1cm.}^{1\%}$ 268)

$\lambda_{inf.}^{phosphate\ buffer\ (pH\ 6.4)}$ 287–290 m$\mu$ ($E_{1cm.}^{1\%}$ 254)

(u) Sodium 7 - (1H - tetrazol-1-ylacetamido)-3-(5-methylthio - 1,3,4 - thiadiazol - 3 - ylthiomethyl) - 3-cephem-4-carboxylate UV: $\lambda_{max.}^{phosphate\ buffer\ (pH\ 6.4)}$ 275 m$\mu$ ($E_{1\ cm.}^{1\%}$ 274)

$\lambda_{inf.}^{phosphate\ buffer\ (pH\ 6.4)}$ 287 m$\mu$ ($E_{1\ cm.}^{1\%}$ 258)

Example 11

(a) Preparation of ethyl-2-mercapto-1,3,4-thiadiazol-5-acetate: A solution of 6.0 g. of ethyl ethoxycarbonylmethyldithiocarboxylate and 5.55 g. of the triethylamine salt of dithiocarbazic acid in 80 ml. of pyridine was stirred at room temperature for one hour and refluxed for two hours. The reaction mixture was concentrated by evaporation under reduced pressure leaving an oily residue which was dissolved in 20 ml. of water and extracted with 200 ml. of ether. The ethereal extract was dried over sodium sulfate and concentrated by evaporation under reduced pressure to yield 2.8 g. of ethyl 2-mercapto-1,3,4-thiadiazole-5-acetate, B.P. 168–170° C./0.3–0.4 mm. Hg (b) In substantially the same manner as described in Example 9, there was prepared 7-(1H-tetrazol-1-yl-acetamido)-3-(5-ethoxycarbonylmethyl - 1,3,4 - thiadiazol-2-ylthiomethyl)-3-cephem-4-carboxylic acid, m.p. 152–156° C. (decomposed).

UV: $\lambda_{max.}^{phosphate\ buffer\ (pH\ 6.4)}$ 277 m$\mu$ ($E_{1\ cm.}^{1\%}$ 216)

Example 12

(a) Preparation of 2-mercapto-1,3,4-thiadiazole-5-acetic acid: A solution of 892 mg. of ethyl 2-mercapto-1,3,4-thiadiazole-5-acetate which was prepared as described in Example 11 (a), and 490 mg. of potassium hydroxide in 20 ml. of 99% ethanol was stirred at room temperature for 3 hours to form the potassium salt which was recovered by filtration. The salt was dissolved in 10 ml. of water and washed with 100 ml. of ether. The aqueous layer was washed with 100 ml. of ether and adjusted by the addition of 10% hydrochloric acid to a pH of 2.0. On extraction with 100 ml. of ether and distilling off the ether from the ethereal extract, crystals were obtained which were washed with petroleum ether to yield 311 mg. of 2-mercapto-1,3,4-thiadiazole-5-acetic acid, m.p. 158–160° C. (decomposed).

(b) By following substantially the same procedures as used in Example 9, there was prepared 7-(1H-tetrazol-1-yl-acetamido)-3-(5-carboxymethyl - 1,3,4 - thiadiazol-2-ylthio-methyl)-3-cephem-4-carboxylic acid, m.p. 145–150° C. (decomposed).

UV: $\lambda_{max.}^{phosphate\ buffer\ (pH\ 6.4)}$ 274 m$\mu$ ($E_{1\ cm.}^{1\%}$ 244)

Example 13

(a) Preparation of 5-(3-methoxypropylaminocarbonylmethyl)-1,3,4-thiadiazole-2-thiol: A solution of 1.5 g. of ethyl 2-mercapto-1,3,4-thiadiazole-5-acetate and 3.0 g. of 3-methoxypropylamine in 20 ml. of absolute ethanol was refluxed for 13 hours and concentrated by evaporation under reduced pressure. The residue was dissolved in 10 ml. of 5% sodium hydroxide solution. After removal of excess 3-methoxypropylamine by extraction with ether, there were added to the solution 200 ml. of ethyl acetate, the mixture was adjusted by the addition of 10% hydrochloric acid to a pH of 2.0, the separated ethyl acetate extract was washed with aqueous saturated sodium chloride solution, dried over sodium sulfate, and concentrated by evaporation under reduced pressure to yield crystals which were washed with ethyl acetate. The crystals were recrystallized from ethyl acetate to yield pure crystals, m.p. 113–114° C.

(b) In substantially the same manner as described in Example 9, there was prepared 7-(1H-tetrazol-1-yl-acetamido)-3-[5 - (3 - methoxypropylaminocarbonylmethyl)-1,3,4-thiadiazol-2-ylthiomethyl] - 3 - cephem-4-carboxylic acid, m.p. 95–100° C. (decomposed).

UV: $\lambda_{max.}^{phosphate\ buffer\ (pH\ 6.4)}$ 274 m$\mu$ ($E_{1\ cm.}^{1\%}$ 193)

Example 14

(a) Preparation of 5-dimethylaminomethyl-1,3,4-oxadiazole-2-thiol: To 400 ml. of absolute benzene having adsorbed therein gaseous dimethylamine which was evolved by the dropwise addition of 44 g. of dimethylamine to concentrated sodium hydroxide solution, there were added slowly 60 g. of ethyl chloroacetate while cooling at 0–5° C. The mixture was stirred at 0–5° C. for one hour and at room temperature overnight. After removal of the dimethylamine hydrochloride formed thereby, the benzene layer was concentrated by evaporation to yield an oily residue (38 g.) which was reacted with 13.8 g. of hydrazine hydrate in 70 ml. of absolute ethanol. The reaction solution was refluxed for 2 hours and was allowed to stand for 2 days. The reaction mixture was diluted with 280 ml. of absolute ethanol and, while cooling, 5 N hydrochloric acid was added drop by drop to form crystals, d.p. 178–181° C. This compound (11.3 g. was added to a solution of 10.3 g. of potassium hydrochloride in 99% ethanol. The mixture was stirred while cooling in an ice-water mixture. After the addition of 6.7 g. of carbon disulfide, the solution was refluxed for four hours, and the alcoholic layer was concentrated by evaporation under reduced pressure leaving an oily residue which was dissolved in about 30 ml. of water while cooling. Adjustment of the pH of the solution to a pH of about 4.0 yielded crystals which were recovered by filtration. The resulting crude reaction product was recrystallized from about 70 ml. of water and yielded colorless prisms, d.p. 214–215° C.

UV: $\lambda_{max.}^{phosphate\ buffer\ (pH\ 6.4)}$ 257 m$\mu$ $\epsilon = 11,600$ (b) By following substantially the same procedures as used in Example 9, there were prepared 117 mg. of 7-(1H - tetrazol-1-ylacetamido)-3-(5-dimethylaminomethyl-1,3,4 - oxadiazol - 2-ylthiomethyl)-3-cephem-4-carboxylic acid, m.p. 98–100° C. (decomposed).

UV: $\lambda_{max.}^{phosphate\ buffer\ (pH\ 6.4)}$ 265 m$\mu$ ($E_{1\ cm.}^{1\%}$ 203)

Example 15

(a) Preparation of 1 - methoxypropyl-1H-tetrazole-5-thiol: To a solution of 30 g. of methoxypropylamine and 34 g. of triethylamine in 50 ml. of absolute methanol there were added, while cooling below 10° C., 25.6 g. of carbon disulfide within about 30 minutes. The mixture was stirred below 10° C. for one hour and then reacted with 48 g. of methyl iodide and stirred at room temperature for another 3 hours and allowed to stand overnight. After distilling off the methanol under reduced pressure, the residue was dissolved in water and extracted two times with ether. The ethereal layer was washed with an aqueous saturated sodium chloride solution and dried over sodium sulfate whereafter the ether was distilled off. A yellow brown oil (8.5 g.) was obtained, which was dissolved in a mixture of 30 ml. of 95% ethanol and 25 ml. of water. After the addition of 4.7 g. of sodium azide under cooling, the solution was refluxed for 3 hours. The ethanol was distilled off under reduced pressure to precipitate excess sodium azide which was removed by filtration. Acetone was distilled from the filtrate leaving a residue which was acidified to a pH of 1.0 by the addition of 10% hydrochloric acid whereby an oil separates. The mixture was extracted two times with ether, and the ethereal layer was washed with a saturated sodium chloride solution and dried over sodium sulfate, whereafter the ether was distilled off to yield a yellow oily product (9.0 g.); potassium salt thereof: d.p. 143–145° C.

UV: $\lambda_{max.}^{phosphate\ buffer\ (pH\ 6.4)}$ 266 m$\mu$ $\epsilon = 12,200$ (b) By following substantially the same procedures as used in Example 9, there were prepared 610 mg. of 7-(1H - tetrazol - 1 - ylacetamido3-(1-methoxypropyl-1H-tetrazol - 5-ylthiomethyl)-3-cephem-4-carboxylic acid, d.p. 82–83° C.

UV: $\lambda_{max.}^{phosphate\ buffer\ (pH\ 6.4)}$ 286 m$\mu$ ($E_{1\ cm.}^{1\%}$ 188)

Example 16

To a solution of 194 mg. of 1,2,3-thiadiazole-5-acetic acid and 136 mg. of triethylamine in 10 ml. of acetone there were added, while stirring at −10° C., 161 mg. of pivaloyl chloride in 2 ml. of acetone. While the solution was vigorously stirred at −30° C. for 40 minutes, a solution of 510 mg. of 7-amino-3-(5-methyl-1,3,4-thiadiazol-2-ylthiomethyl)-3-cephem-4-carboxylic acid and 500 mg. of triethylamine in 10 ml. of water and 10 ml. of acetone was added. The solution was allowed to react at −30° C. for one hour, at 0–5° C. for another hour, and at room temperature for 3 more hours. The reaction mixture was allowed to stand and filtered. After distilling off the acetone from the filtrate, the solution was washed with ether. The aqueous layer was adjusted by the addition of 10% hydrochloric acid to a pH of 2.0 and was extracted with 200 ml. of ethyl acetate. The ethyl acetate extract was dried over sodium sulfate. After distilling off the ether, there were obtained 160 mg. of 7-(1,2,3-thiadiazol-5-yl-acetamido) - 3 - (5-methyl-1,3,4-thiadiazol-2-ylthiomethyl) - 3-cephem-4-carboxylic acid, m.p. 117–122° C. (decomposed).

UV: $\lambda_{max.}^{phosphate\ buffer\ (pH\ 6.4)}$ 255 m$\mu$ ($E_{1\ cm.}^{1\%}$ 302)

$\lambda_{max.}^{phosphate\ buffer\ (pH\ 64)}$ 270 m$\mu$ ($E_{1\ cm.}^{1\%}$ 208)

Example 17

A solution of 400 mg. of 7-(1H-tetrazol-1-ylacetamido)-3-(5-methyl-1,3,4-thiadiazol-2-ylthiomethyl)-3-cephem-4-carboxylic acid in aqueous acetone was reacted with an acetone solution of 180 mg. of dicyclohexylamine to produce crystals (0.32 g.) of the dicyclohexylamine salt of said acid.

UV: $\lambda_{max.}^{ethanol}$ 275 m$\mu$ ($E_{1\ cm.}^{1\%}$ 184)

MIC (mcg./ml.): *E. coli* 5.0; *S. aur.* 1.0

Example 18

A solution of 900 mg. of 7-(1H-tetrazol-1-yl-acetamido)-3 - (5-methyl-1,3,4-thiadiazol-2-ylthiomethyl)-3-cephem-4-carboxylic acid and 400 mg. of dibenzylamine in 10 ml. of methanol and 5 ml. of chloroform was concentrated by evaporation in vacuum followed by the addition of acetone. Thereby 1.1 g. of the crystalline dibenzylamine salt were obtained, m.p. 164–166° C. (decomposed).

UV: $\lambda_{max.}^{ethanol}$ 276 m$\mu$ ($E_{1\ cm.}^{1\%}$ 205)

MIC (mcg./ml.): *E. coli* 5.0; *S. aur.* 0.5

Example 19

An aqueous solution of sodium 7 - (1H-tetrazol-1-yl-acetamido)-3-(5-methyl-1,3,4-thiadiazol-2-ylthiomethyl)-3 - cephem-4-carboxylate was reacted with 160 mg. of guanyl urea sulfate by allowing the mixture to stand in an icebox. Thereby crystals were obtained by filtration (420 mg.) The compound melts at 117–120° C. (decomposed).

UV: $\lambda_{max.}^{ethanol}$ 298 m$\mu$ ($E_{1\ cm.}^{1\%}$ 404)

$\lambda_{max.}^{ethanol}$ 223 m$\mu$ ($E_{1\ cm.}^{1\%}$ 234)

MIC (mcg./ml.): *E. coli* 5.0; *S. aur.* 0.5

Example 20

To a solution of 900 mg. of 7-(1H-tetrazol-1-ylacetamido) - 3 - (5-methyl-1,3,4-thiadiazol-2-ylthiomethyl)-3-cephem-4-carboxylic acid in aqueous acetone there were added 470 mg. of N-(2,6-dimethylphenyl)aminocarbonylmethyldiethylamine. The mixture was allowed to stand and yielded crystals of the corresponding amine salt, m.p. 156–158° C. (decomposed).

UV: $\lambda_{max.}^{ethanol}$ 274 m$\mu$ ($E_{1\ cm.}^{1\%}$ 176)

MIC (mcg./ml.): *E. coli* 5.0; *S. aur.* 0.5

Example 21

An aqueous solution of 900 mg. of 7-(1H-tetrazol-1-ylacetamido)-3-(5 - methyl-1,3,4-thiadiazol-2-ylthiomethyl)-3-cephem-4-carboxylic acid, to which 120 mg. of calcium chloride were added, was allowed to stand at room temperature to form crystals of the calcium salt which were recovered by filtration (960 mg.); m.p. above 280° C.

Example 22

A solution of 2.2 g. of sodium 7-(1H-tetrazol-1-ylacetamido)-3-(5 - methyl-1,3,4-thiadiazol-2-ylthiomethyl)-3-cephem-4-carboxylate in 20 ml. of dimethylformamide to which 0.73 g. of allylbromide were added at once while cooling, was stirred at the same temperature for 30 minutes and then at room temperature for another 5 hours. After the addition of water, the reaction mixture was neutralized with sodium bicarbonate solution and then extracted with ethyl acetate. The ethyl acetate layer was washed with aqueous saturated sodium bicarbonate solution and with water and dried over sodium sulfate followed by distilling off the solvent under reduced pressure. 4.5 g. of faint yellowish crystals were obtained which were recrystallized from 95% ethanol to yield crystals of allyl 7 - (1H-tetrazol-1-ylacetamido)-3-(5-methyl-1,3,4-thiadiazol-2-ylthiomethyl)-3-cephem-4-carboxylate, m.p. 193–195° C. (decomposed).

Example 23

7-(1H-Tetrazol - 1 - ylacetamido)-3-(5-methyl-1,3,4-thiadiazol-2-ylthiomethyl)-3-cephem - 4 - carboxylic acid, (2.27 g.), and 505 mg. of triethylamine were dissolved in 10 ml. of absolute dimethylformamide while cooling at 0–5° C. After addition of 322 mg. of chloromethyl ether in 2 ml. of dimethylformamide, the resulting solution was stirred at room temperature for 3 hours and allowed to stand overnight. The reaction mixture was filtered and the filtrate was extracted with 200 ml. of ethyl acetate. The ethyl acetate extract was dried over sodium sulfate and concentrated by evaporation leaving a residue which was washed with ether to yield a powder which was recrystallized from 95% ethanol. 1.83 g. of methoxy-methyl 7-(1H-tetrazol-1-ylacetamido)-3-(5-methyl - 1,3,4 - thiadiazol-2-ylthiomethyl)-3-cephem - 4 - carboxylate were obtained, m.p. 115–120° C. (decomposed).

UV: $\lambda_{max.}^{70\%\ tetrahydrofuran}$ 266 m$\mu$ ($E_{1\ cm.}^{1\%}$ 242)

Example 24

A solution of 908 mg. of 7-(1H-tetrazol-1-ylacetamido)-3 - (5-methyl-1,3,4-thiadiazol-2-ylthiomethyl)-3-cephem-4 - carboxylic acid and 556 mg. of 2,4'-dibromoacetophenone in 4 ml. of absolute dimethylformamide and 4 ml. of absolute tetrahydrofuran was stirred while cooling at 0–5° C. whereafter 2 ml. of absolute tetrahydrofuran containing 202 mg. of triethylamine were added within 5 minutes. The solution was stirred for 5 hours at 0–5° C., allowed to stand overnight, and filtered. The filtrate was washed with two 30 ml. portions of water and extracted with 200 ml. of ethyl acetate. The ethyl acetate extract was washed with two 15 ml. portions of saturated sodium bicarbonate solution and dried over sodium sulfate. The solvent was distilled off yielding a residue which was washed with ether. 1.045 g. of the crude reaction product were obtained which were recrystallized from an acetone-methanol mixture to yield pure crystals of p-bromobenzoylmethyl 7 - (1H-tetrazol-1-ylacetamido)-3-(5-methyl-1,3,4-thiadiazol - 2 - ylthiomethyl)-3-cephem-4-carboxylate, m.p. 179–181° C. (decomposed).

UV: $\lambda_{max.}^{95\%\ ethanol}$ 261 m$\mu$ ($E_{1\ cm.}^{1\%}$ 471)

MIC (mcg./ml.): *E. coli* above 50; *S. aur.* 10.

It is understood that by selecting the appropriate starting materials and otherwise proceeding as described in the preceding examples, the following related compounds can be produced:

7-(1H-tetrazol-1-yl-acetamido)-3-(5-methoxycarbonyl-methyl-1,3,4-thiadiazol-2-ylthiomethyl)-3-cephem-4-carboxylic acid,
7-(1H-tetrazol-1-yl-acetamido)-3-(5-dimethylamino-ethylamino carbonylmethyl-1,3,4-thiadiazol-2-ylthio-methyl)-3-cephem-4-carboxylic acid,
7-(1H-tetrazol-1-yl-acetamido)-3-(5-methoxymethyl-1,3,4-thiadiazol-2-ylthiomethyl)-3-cephem-4-carboxylic acid,
7-(1H-tetrazol-1-yl-acetamido)-3-(5-dimethylaminometh-yl-1,3,4-thiadiazol-2-yl-thiomethyl)-3-cephem-4-car-boxylic acid,
7-(1H-tetrazol-1-yl-acetamido)-3-(1-methoxycarbonyl-methyl-1H-tetrazol-5-ylthiomethyl)-3-cephem-4-car-boxylic acid,
7-(1H-tetrazol-1-yl-acetamido)-3-(1-hydroxypropyl-1H-tetrazol-5-ylthiomethyl)-3-cephem-4-carboxylic acid,
7-(1H-tetrazol-1-yl-acetamido)-3-(5-chloromethyl-1,3,4-oxadiazol-2-ylthiomethyl)-3-cephem-4-carboxylic acid,
7-(4-methyl-1,3,5-thiodiazol-2-ylacetamido)-3-(5-methyl-1,3,4-thiadiazol-2-ylthiomethyl)-3-cephem-4-carboxylic acid,
7-(2H-tetrazol-2-ylacetamido)-3-(5-methyl-1,3,4-thia-diazol-2-ylthiomethyl)-3-cephem-4-carboxylic acid, and others.

In addition to the sodium and calcium salts and the salts with organic amines of the 3,7-disubstituted cephalosporin compounds disclosed and claimed in application Ser. No. 721,082 and herein, there can be prepared other salts of such compounds, such as other alkali and alkaline earth metal salts, for instance, the potassium or ammonium salts or the magnesium salts or also salts with other metals such as aluminum, zinc, silver, iron, and the like metal salts. Salts with other organic amines than those described herein and in application Ser. No. 721,082, such as with ethanolamine, diethanolamine, and others have also proved of value.

It is also understood that other esters of the 3,7-disubstituted 3-cephem-4-carboxylic acids than those described in the preceding examples can be prepared such as the lower alkyl esters, for instance, the methyl, ethyl, propyl, isopropyl, butyl esters, the phenyl lower alkyl esters, for instance, the benzyl ester, and the like of the acids described and claimed herein as well as of the acids described and claimed in application Ser. No. 721,082, i.e. of 7 - acylamino-3-thiomethylceph-3-em-4-carboxylic acids which are substituted in 7-position by a heterocyclic acylamino group and in 3-position by a heterocyclically substituted thiomethyl group. Such esters correspond, for instance, to compounds of the Formula

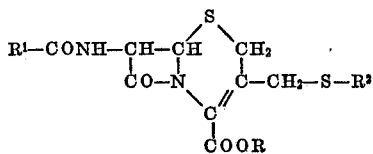

in which
R¹ is a member selected from the group consisting of $R^3-(Alk)_m-$ and $R^3-S-(Alk)_m-$, wherein
$R^3$ is thienyl, diazolyl, triazolyl, tetrazolyl, thiazolyl, thiadiazolyl, thiatriazolyl, oxazolyl, oxadiazolyl, pyridyl, diazinyl, benzothiazolyl, benzimidazolyl, benzoxazolyl, or benzotriazolyl,
$m$ is zero or one, and
Alk is alkylene having a straight or branched chain,
$R^2$ is diazolyl, triazolyl, tetrazolyl, thiazolyl, thiadiazolyl, thiatriazolyl, oxazolyl, oxadiazolyl, benzimidazolyl, benzoxazolyl, triazolopyridyl, diazinyl, or purinyl,
said $R^2$ and $R^3$ members being substituted or unsubstituted, and
R is the residue of an ester-forming alcohol.

We claim:
1. A compound selected from the group consisting of 3,7-disubstituted cephalosporins of the formula

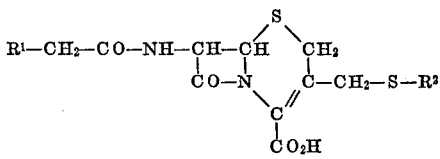

and their pharmaceutically acceptable salts, wherein R¹ is 1H-tetrazol-1-yl and R² is 5-methylthio-1,3,4-thiadiazol-2-yl, 5-ethoxycarbonylmethyl - 1,3,4 - thiadiazol-2-yl, 5-carboxymethyl-1,3,4-thiadiazol-2-yl, 5-(3-methoxypropyl-aminocarbonylmethyl)-1,3,4-thiadiazol-2-yl, 5 - dimethyl-aminoethyl-1,3,4-oxadiazol-2-yl, or 1-methoxypropyl-1H-tetrazol-5-yl.

2. A compound selected from the group consisting of 3,7-disubstituted cephalosporins of the formula

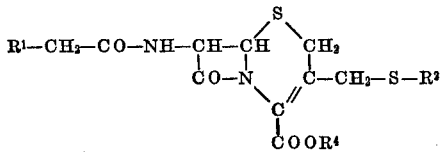

wherein R¹ is 1H-tetrazol-1-yl, R² is 5-methyl-1,3,4-thiadiazol-2-yl and R⁴ is selected from the group consisting of allyl, methoxymethyl and B-bromobenzoylmethyl.

References Cited
UNITED STATES PATENTS
3,516,997   6/1970   Takano et al. _____ 260—243 C NICHOLAS S. RIZZO, Primary Examiner U.S. Cl. X.R.
424—246